(12) United States Patent
Fink et al.

(10) Patent No.: US 12,131,297 B2
(45) Date of Patent: Oct. 29, 2024

(54) AUTOMATIC DETECTION AND RECOGNITION OF VISUAL TAGS

(71) Applicant: STREEM, INC., Portland, OR (US)

(72) Inventors: Ryan R. Fink, Vancouver, WA (US); Sean M. Adkinson, North Plains, OR (US)

(73) Assignee: STREEM, LLC, Portland, OR (US)

( * ) Notice: Subject to any disclaimer, the term of this patent is extended or adjusted under 35 U.S.C. 154(b) by 146 days.

(21) Appl. No.: 16/710,320

(22) Filed: Dec. 11, 2019

(65) Prior Publication Data

US 2020/0193203 A1   Jun. 18, 2020

Related U.S. Application Data

(60) Provisional application No. 62/778,630, filed on Dec. 12, 2018.

(51) Int. Cl.
| | |
|---|---|
| *G06T 7/73* | (2017.01) |
| *G06F 16/903* | (2019.01) |
| *G06Q 10/20* | (2023.01) |
| *G06V 20/20* | (2022.01) |
| *G06V 30/14* | (2022.01) |
| *G06V 30/412* | (2022.01) |
| *G06V 30/10* | (2022.01) |

(52) U.S. Cl.
CPC ......... *G06Q 10/20* (2013.01); *G06F 16/903* (2019.01); *G06T 7/73* (2017.01); *G06V 20/20* (2022.01); *G06V 30/1444* (2022.01); *G06V 30/412* (2022.01); *G06V 30/10* (2022.01)

(58) Field of Classification Search
CPC .... G06K 9/2054; G06K 9/00671; G06K 9/46; G06K 2209/01; G06T 7/73; G06F 16/903
See application file for complete search history.

(56) References Cited

U.S. PATENT DOCUMENTS

| | | | |
|---|---|---|---|
| 8,639,036 B1 * | 1/2014 | Singer | G06K 9/723 382/200 |
| 10,598,507 B1 * | 3/2020 | Lamont | G01C 21/206 |
| 2013/0069781 A1 * | 3/2013 | Terwilliger | G06F 16/9554 340/539.13 |
| 2013/0293734 A1 * | 11/2013 | Fan | G06K 9/46 348/222.1 |
| 2014/0140570 A1 * | 5/2014 | Ross | G06T 7/0008 382/100 |

(Continued)

FOREIGN PATENT DOCUMENTS

JP   2013258703 A   * 12/2013

*Primary Examiner* — Oneal R Mistry
(74) *Attorney, Agent, or Firm* — Schwabe Williams & Wyatt (57) ABSTRACT

Methods and systems for automatic detection and recognition of visual tags on equipment are disclosed. The make and model of an object such as an appliance or consumer device is recognized from an image or video using object detection. This make and model information may then be used to direct a user to locate an equipment information tag that includes model and serial number information. Object recognition and optical character recognition can then be employed to extract the model and serial number from the tag, along with any other relevant information. The extracted information may then be used to locate service and/or operation information.

12 Claims, 5 Drawing Sheets

(56) References Cited

U.S. PATENT DOCUMENTS

| | | | |
|---|---|---|---|
| 2015/0083798 A1* | 3/2015 | Trifa | G06F 16/9554 |
| | | | 235/375 |
| 2015/0190978 A1* | 7/2015 | Jensen | B26F 1/38 |
| | | | 493/22 |
| 2018/0286033 A1* | 10/2018 | Ishiyama | G06T 7/0006 |
| 2019/0050670 A1* | 2/2019 | Pogorelik | G06K 7/1413 |
| 2019/0180150 A1* | 6/2019 | Taylor | G06V 30/224 |
| 2019/0311472 A1* | 10/2019 | Harrup | G06T 7/0004 |
| 2021/0197625 A1* | 7/2021 | Laperle | G06T 7/001 |
| 2021/0264154 A1* | 8/2021 | Lamont | G06V 20/20 |
| 2021/0339758 A1* | 11/2021 | Laperle | B60W 40/12 |
| 2021/0374405 A1* | 12/2021 | Salguero | G06V 20/10 |

\* cited by examiner

AUTOMATIC DETECTION AND RECOGNITION OF VISUAL TAGS

CROSS-REFERENCE TO RELATED APPLICATIONS

This application claims the benefit of U.S. Provisional Application No. 62/778,630, filed on 12 Dec. 2018, the entire contents of which are hereby incorporated by reference herein.

TECHNICAL FIELD

The present disclosure relates to the field of augmented reality (AR), and specifically to detection and recognition of visual tags on various objects.

BACKGROUND

While various products such as appliances, cars, instruments, electronic devices, and other consumer goods may define a class of good, e.g. dishwashers, trucks, phones, and tablets, there are often a number of different manufacturers of goods offering a variety of different makes and models for a given class of product. For example, GE and Whirpool may both manufacture dishwashers that differ from each other. Further, a given manufacturer often offers a variety of different models of a given product. Apple manufactures several different models of iPads, iPhones, Mac Books, and similar products. GE manufactures a variety of different dishwashers with various specifications, e.g. the Adora® line and the Profile® line, to name a few. While different models of a product may share many common components, e.g. doors, motors, agitators, racks, etc., models may vary in a variety of ways, such as other components, assembly and disassembly steps, tuning parameters, calibration steps, and other unique aspects.

Devices such as smartphones and tablets are typically capable of capturing images and/or video and performing various types of processing upon the images. Such processing may include object recognition, which can further include optical character recognition (OCR) for detecting text in captured images and/or video. One or more recognized objects and, in particular, detected text can further be used as input to a database or on-line search to locate additional information related to the recognized objects or text.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

As devices may vary in construction from model to model, it is important that the specifics of a given device's construction, operation, and, particularly to a person who may service the device, the steps required to properly repair the device are known. Without such knowledge, a user may be unable to successfully operate the device or, worse, may inadvertently damage the device; similarly, a device repair may be performed improperly or, worse, may result in further damage to the device.

Manufacturers may make service instructions available to allow for proper repair and servicing of devices they sell. However, locating the correct repair and/or service information often requires knowledge of a particular device's make and model information. Further still, devices of a given make and model may have changed over time as manufacturing techniques are refined, parts suppliers change, and/or internal device configurations are changed or refined. In such a scenario, obtaining the necessary repair information may require knowing not only the device's make and model, but also serial number, which can be used to look up and retrieve the correct information. Typically, manufacturers affix make, model, and serial number information in an inconspicuous location, such as the back or bottom of a device. For larger appliances, this information may be provided on a label, sticker, plate, or tag, which may be affixed on the inside of a door, in a door frame, on a sidewall of an interior cavity, on the back or exterior side of a device, or another suitable location that is reasonably accessible, but does not otherwise interfere with the appearance and/or function of the device.

Most internet-connected devices such as smartphones and tablets can be configured to analyze images or videos using object detection and/or OCR algorithms. For example, apps are available for smartphones and tablets that allow the device to capture an image or video that contains text, identify the location of the text within the image frame, and perform OCR upon the recognized text to extract the actual text. This text can then be used as input to a search engine or database, or other application.

In the context of the present disclosure, in embodiments, a smartphone, tablet, or other device of suitable functionality can be configured to use object recognition to locate relevant make, model, and serial number information on a device, such as by detecting the presence of a label or plate on an appliance, or the format of relevant information on other devices. The device can then extract the relevant information using an OCR algorithm, and use the extracted information to locate and retrieve the appropriate service information. This information may be used in conjunction with a video chat session with a service professional to provide an owner of the device or appliance to be serviced the correct instructions for servicing the device or appliance. Similarly, the information can be used to locate and retrieve operational information, such as a product manual or on-line help. Still further, the information could be used to retrieve on-line or other relevant resources such as videos or websites related to the product, e.g. crowd-sourced information such as on-line tutorials provided by other users of the device, the website of the device manufacturer, online forums for device owners, etc.

Figure 1:
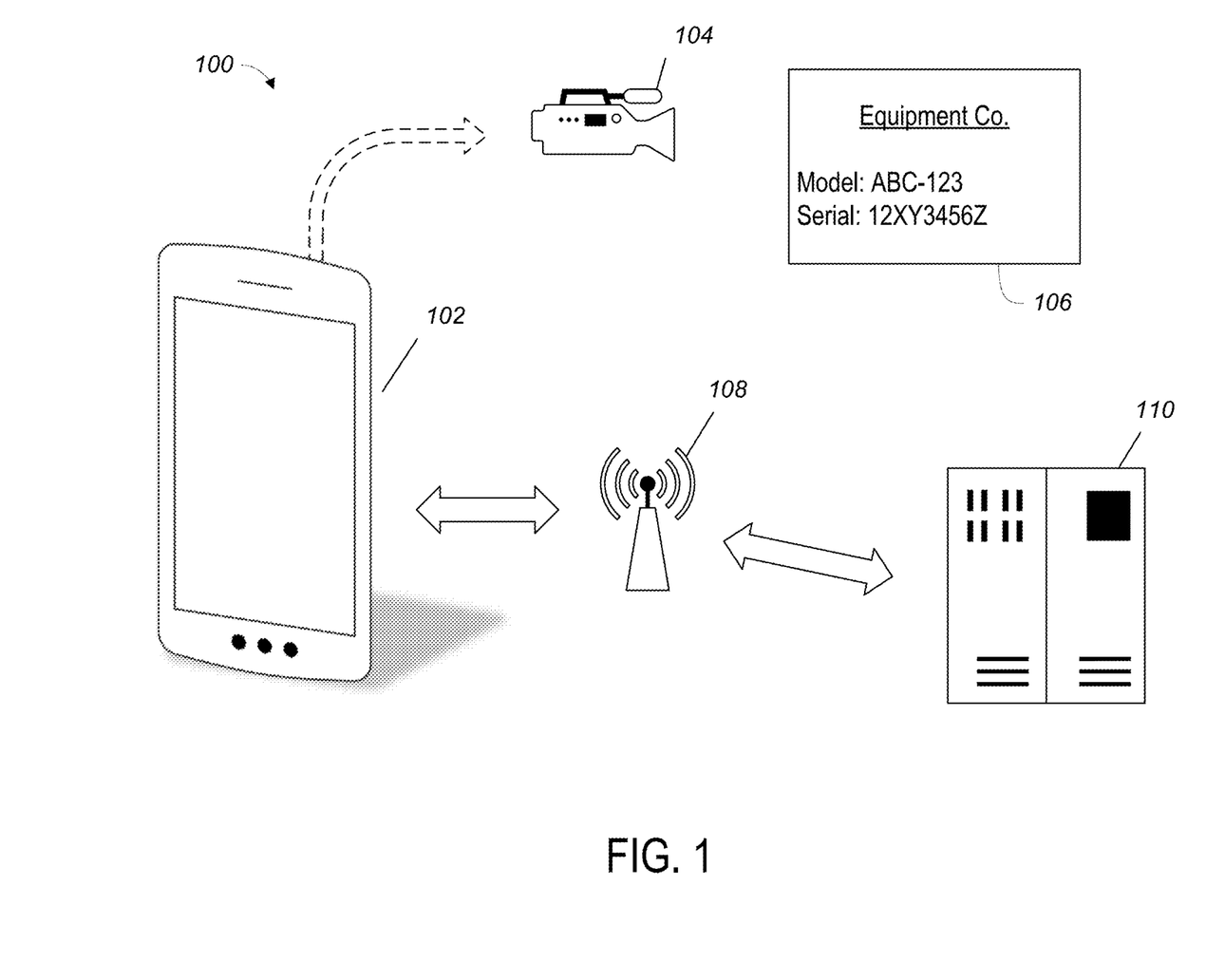
FIG. 1 illustrates a block diagram of the components of an example system for recognizing and extracting model information from an image or video of device, according to various embodiments.

FIG. 1 illustrates an example system 100 for automatic detection and recognition of visual tags, such as product or appliance model and serial number information. System 100 may include a consumer device 102. In the depicted embodiment of FIG. 1, consumer device 102 is a smartphone, which may be implemented as a computer device 500, to be discussed in greater detail below. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein.

Consumer device 102 further includes a camera 104, which may be integrated into consumer device 102 or otherwise attached or in data communication with consumer device 102. Camera 104 may be any camera that can provide a suitable image or video stream for the intended purpose of consumer device 102. Where consumer device 102 is implemented as a smartphone or tablet, camera 104 may be a built-in camera. In other embodiments, such as where consumer device 102 is a laptop, camera 104 may be built in or a separate, external unit. A suitable image may be captured to any suitable file type, e.g. PNG, GIF, JPEG, BMP, TIFF, or another suitable image format, which may be compressed or uncompressed, and may utilize a lossless or lossy encoding scheme. A suitable video stream may be a digital video stream, and may be compressed in embodiments with some form of video compression, such as AVC-HD, H.264, MPEG-4, or another suitable compression scheme. In other embodiments, the image or video stream may be captured to a proprietary format, such as a format specific to consumer device 102, suitable for internal processing, or specific to be processed by another device in system 100. Camera 104 may be configured to output standard or high-definition video, 4K video, or another resolution of video suitable for the intended purpose of camera 104 and consumer device 102.

In the depicted embodiments, consumer device 102 captures a picture or video of equipment information 106 using camera 104. Equipment information 106 may be secured to, imprinted upon, or otherwise associated with a piece of equipment that a user of system 100 may intend to service. As discussed above, equipment information 106 may include various data about the associated piece of equipment, including manufacturer name and information, model information, serial number, manufacture date, place of origin, operating specifications, and any other pertinent information that may be usable when servicing the associated piece of equipment. Such data may be presented in either a human readable format, a machine readable format (e.g. bar code, QR code, RFID tag, or similar structure), or a combination of both.

Consumer device 102, in embodiments, includes network communication functionality, such as a wired or wireless network interface for connecting to a network 108, depicted here as a wireless transceiver. Such network communications may be implemented using any suitable technology, such as WiFi, Bluetooth, or cellular technologies including 3G, 4G/LTE, 5G, or any other suitable wireless communications protocols now known or later developed. Wired communications may include Ethernet, or a serial interface such as USB, or another suitable wired communication protocol now known or later developed.

Consumer device 102, in some embodiments, communicates with a central server 110, via network 108. Central server 110 may be located remote from consumer device 102, and in some embodiments may be implemented as a cloud or distributed service. In other embodiments, central server 110 may be a private server, such as may be owned by an organization that also owns consumer device 102. Network 108, in embodiments, may comprise the Internet, at least partially, or may comprise a local area network, a wide area network, a metropolitan area network, or some combination of any of the foregoing. Central server 110 may provide at least some of the functionality required to implement the methods described below. Central server 110 may be operated by a third party, unrelated to the operator of consumer device 102 (e.g. when central server 110 is provided via a cloud service), and may accordingly offer services implementing the methods described herein to subscribers, such as a user of consumer device 102. Further still, although not depicted, central server 110 may act to facilitate communications between a user of consumer device 102 and a third party, such as a technician or service person. The third party may further be able to send and receive data to/from consumer device 102 via central server 110.

Figure 2:
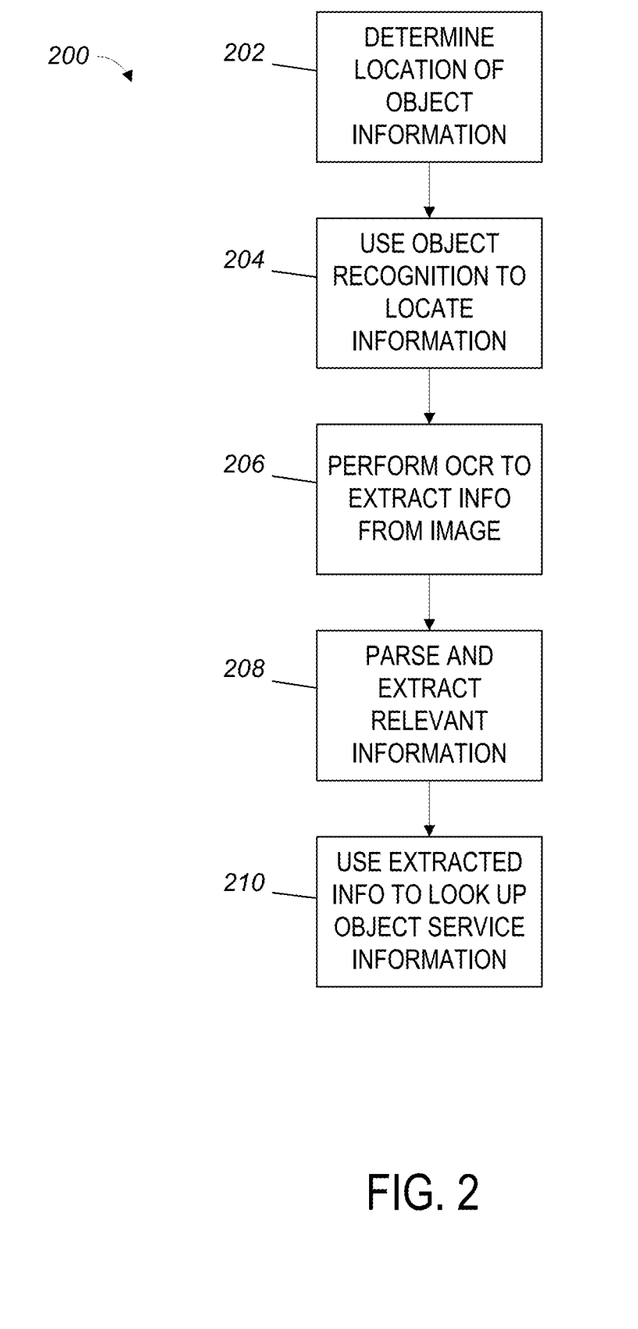
FIG. 2 is a flowchart of an example method for recognizing and extracting model information from an image or video of a device that may be performed by the system of FIG. 1, according to various embodiments.

Central server 110, in some embodiments, includes a database or databases of various objects, such as appliances, consumer electronics, etc., that may be used in conjunction with method 200 for performing recognition of visual tags. In other embodiments, central server 110 may rely upon search functions, such as Google®, or other Internet-accessible search engines, to supply any information needed to help carry out the various steps of example method 200. In still other embodiments, central server 110 may use a combination of a local database and Internet-accessible resources. For example, central server 110 may include high-level information about various objects and then rely upon Internet resources to obtain additional information, or may include comprehensive information about commonly found objects, and rely upon Internet resources to obtain information about relatively more obscure objects. In other embodiments, a combination of any of the foregoing may be used.

It should be understood that the configuration and components depicted in system 100 of FIG. 1 are only one possible configuration. Other embodiments may have consumer device 102 communicate with other components across network 108, or may directly communicate with a server, such as central server 110, directly, without using network 108. Still other embodiments may have consumer device 102 communicate with service providers directly, either via initial contact or via central server 110. Central server 110 may then hand off communications so that consumer device 102 communicates directly with a service provider.

FIG. 2 depicts the operations for an example method 200 for automatic detection and recognition of visual tags containing equipment or product information. The various operations of method 200 may be implemented in whole or in part by system 100, or by one or more components of system 100. Various operations and/or functionality may be implemented with various components of system 100, such as central server 110 and consumer device 102. The selection of component(s) to perform various functions will depend upon the specific implementation. For example, in some embodiments consumer device 102 may perform many of the operations of method 200, possibly using a dedicated application or applications. In other embodiments, functionality may be implemented using central server 110, with consumer device 102 acting primarily as a data collection point, and forwarding data such as device images to central server 110 for processing. Central server 110 may provide object processing, recognition and/or look up services, such as will be described further below. Still other embodiments may distribute various processing aspects across multiple components of system 100. In some embodiments, consumer device 102 may run a dedicated application that interfaces with central server 110. In still other embodiments, consumer device 102 may interface with central server 110 via a web browser or web browser-based interface.

Starting with operation 202, the location of information about an object such as a device, appliance, or other piece of equipment is initially determined. In some embodiments, a consumer device, such as consumer device 102 via camera 104, is used to capture an image of the object, which is then analyzed to determine one or more specific aspects of the object. One or more object recognition algorithms may be used in analysis, to extract features such as overall shape, shape and position of features such as handles, knobs, burners, doors, faucets, dispensers, controls, displays, logos or brands, model names/line names, etc. These aspects, in turn, may be used to determine preliminary information about the object, such as object type (e.g. dishwasher, refrigerator, range, television, cell phone), and possibly make (e.g. GE, Whirlpool, Apple, Samsung) and model (e.g. Adora, Profile, Galaxy, iPhone). The preliminary information may then be used by an implementing system to search into one or more databases to determine a likely make and/or model of the object.

With one or more of these aspects identified, an implementing system, such as system 100, may be able to provide preliminary information to a user about the location of the equipment information. For example, if it is determined that the device is a Whirlpool refrigerator, the implementing system may reference information about Whirlpool refrigerators that indicates that the equipment information is typically located inside the refrigeration compartment on the sidewall. Similarly, if it is determined that the device is a Kitchen Aid dishwasher, the system may indicates that the equipment information is on the frame of the dishwasher, just inside the door. Such information may be determined by referencing a database, such as may be provided by a central server 110; by referencing an Internet search, which may be carried out by a central server or consumer device; or by another suitable technique or process to obtain equipment information location.

In instances where the make and/or model of an object is not known and the user of the consumer device is also not aware of the make and/or model, likely locations for equipment information may be provided based upon the type of object. For example, where the object is a refrigerator but the make and model is not otherwise known, or where specific information about the location of the equipment information is not available, then the user may be instructed to check inside the refrigerator compartment, on the inside of the door, on the side of the unit, etc., or other likely locations for the equipment information. Such uncertainty can be passed to subsequent operations to allow for further object detection to verify that the equipment information has been located.

In some cases, depending upon the manufacturer, not only the type of object (e.g. refrigerator, cell phone), but also the model or model line may be determined (e.g. GE Profile series, Apple iPhone) from the exterior appearance of the object. In other cases, the manufacturer may not be readily determined. For example, some dishwashers that use top controls may present a front that is substantially a featureless rectangle, save for a handle. Such an appearance may be presented by models from a number of different manufacturers, making determining a particular manufacturer, let alone a specific model or even model line, infeasible. The consumer device, such as consumer device 102, may be configured to prompt the user in such cases to indicate a manufacturer and/or model. In some examples, indicating the manufacturer may then enable determination of the specific model. In other examples, both the manufacturer and model may need to be manually entered by a user. In such examples, the implementing system, such as system 100, may forego object recognition/analysis of the object, and instead use the user-supplied information to look up where the equipment information is to be found. In still other embodiments, the exterior appearance of the object may be sufficient to allow a subset of possible manufacturers and/or models to be presented, from which the user may select.

Following determining the location of the object or the equipment information, the user may be presented with instructions or guidance about where to locate the equipment information. Such instructions may include a general depiction of the layout of the equipment information, along with specific highlighting of the equipment information location relative to the appearance of the object. In some embodiments, the location of the equipment information may be indicated with respect to the particular perspective of the user, determined as the perspective of the consumer device. In still further embodiments the perspective may be indicated using a captured image of the object, which may be an image captured by the consumer device. Alternatively or additionally, the location of the equipment information may be presented in an augmented reality (AR) format overlaid on a video feed of the object, such as may be captured by a camera on the consumer device, with the location indicia or highlighting anchored to its location in a video feed, as may be understood in AR techniques. In some examples, AR instructions may be supplied to the user to access the location of the equipment information, such as where the location is not immediately visible, e.g. a door or access hatch must be opened, the object must be turned around or turned over, etc. Instructions may be presented using AR cues, such as arrows or actions indicating a panel or door to be opened, a latch to be unlocked, etc. Where the make and/or model of the object are known, the user may further be supplied with a picture or representation of the equipment information, so that the user can be aware of what to look for.

In still other scenarios, the user may already know the location of the equipment information. In such a scenario, the user may opt to skip identification from a picture of the object and simply take a photo of the equipment information directly. In some embodiments, the user may also be prompted to tell the implementing system, such as a system 100, about the object's make and model to allow system 100 to more accurately process the photo of the equipment information. In such an embodiment, operations 202 and 204 may effectively be skipped or omitted.

In operation 204, once the location of the equipment information has been accessed, object recognition may be employed to locate the actual tag, panel, or informational area containing the equipment information. As mentioned above, the shape of the equipment information may be presented to the user so that the user knows towards what to direct the capturing device, e.g., camera on the consumer device. This shape can also be used, in embodiments, as an input into an object recognition algorithm (such as may be run by a consumer device 102, central server 110, or both, or another device), to accurately locate the actual equipment information. Some implementations may use visual cues presented on the consumer device to allow a user to quickly match the shape of the equipment information placard, decal, or other area, such as by portraying a silhouette of the equipment information shape on a display, thus allowing a user to simply match up shapes.

Following object recognition in operation 204 and/or confirmation of the correct location of the equipment information, in operation 206 the image of the equipment information from a capture device, such as a camera 104, may be analyzed to extract the relevant information. In some embodiments, this information may be extracted using an optical character recognition (OCR) routine, which are widely known in the prior art and will not be discussed in detail here.

Figure 3:
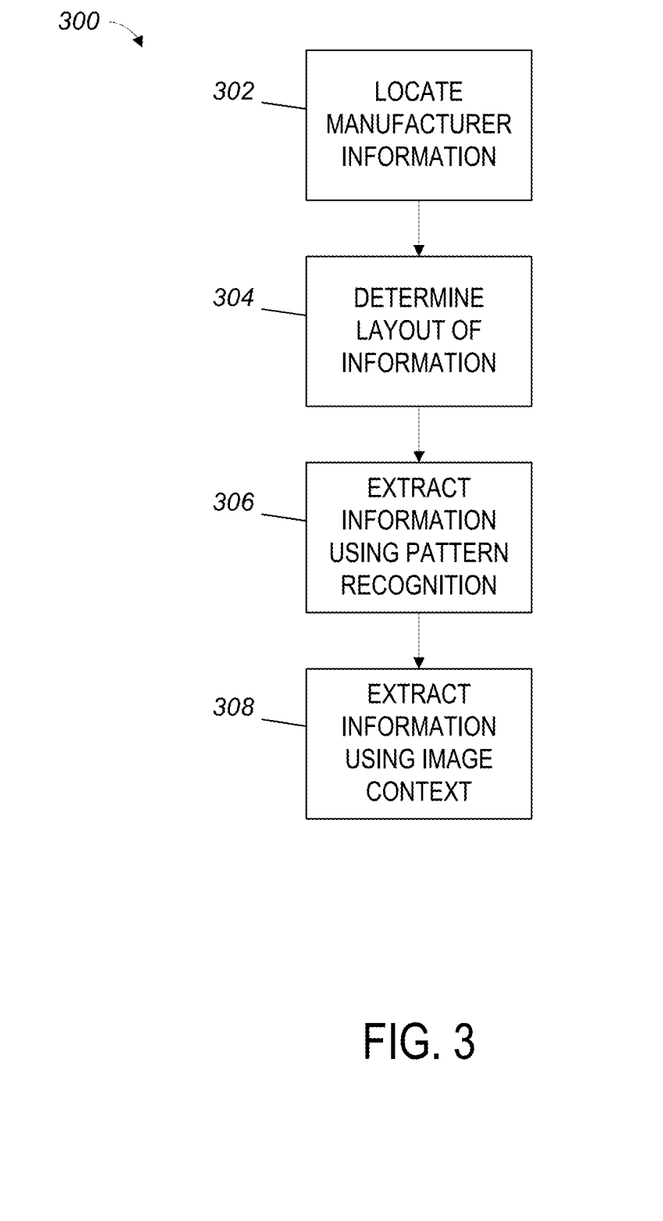
FIG. 3 is a flowchart of an example method for determining relevant information from an image or video of device model information that may be performed as part of the method of FIG. 2, according to various embodiments.

The resulting strings of recognized characters and symbols is then parsed in operation 208, and the relevant information is extracted from the equipment information. In examples, the relevant information comprises at least the model number and serial number of the object. Relevant information may be any information that allows further information about the identified object (appliance, device, etc.) to be referenced, such as service manuals, instruction manuals, warranty information, service bulletins, recall notices, etc. The details of this step will be described in greater detail below with respect to method 300.

Finally, in operation 210, the extracted information from operation 208 is used to determine appropriate service information about the object or device. Such information may include user's or operator's manual(s), service or shop manual(s), service bulletins, informational postings, chat threads, etc., and/or any other information that may be used to operate and/or service the object or device. Such information may then be provided to the user, and may further be presented to the user upon a consumer device, such as consumer device 102. In other examples, a professional may be in communication with the user, such as via consumer device 102 in communication with system 100, possibly through central server 110, and the professional may also/instead be presented with the appropriate service information to assist the user in repairing, servicing, or otherwise operating the object. The implementing system may include a repository of appropriate manuals and other related or similar literature, and/or may be able to obtain such information via the Internet, such as directly from the object manufacturer, or other source of information.

FIG. 3 depicts the operations for an example method 300 for parsing and extracting relevant information from a captured equipment information. Relevant information, in particular, relevant identifying information, may be used to locate additional information and resources about the identified object, as discussed above. Method 300 may be executed as a part of operation 208 of method 200. Method 300 thus may be carried out, in embodiments, in whole or in part via one or more components of system 100, as with method 200. It should be appreciated that method 200 and method 300 may be carried out as a continuous sequence of steps. The separation of method 300 into a separate flow chart is done only for illustrative purposes, and is not intended to be limiting or otherwise suggest that method 300 must be carried out separately or independently from method 200. Moreover, some operations of method 300 may not need to be performed, for example where manufacturer and model information are positively determined, such as by object recognition in operation 202 and/or by direct input from a user, such as through consumer device 102. Depending upon the information available to an implementing system, such as system 100 through operations 202 to 206, only one or two operations of method 300 may be necessary, with other operations only relevant where information about the layout of the equipment information is unavailable.

In operation 302, information following performing OCR upon the equipment information in operation 206, data from OCR is received and first parsed to locate manufacturer information, either to confirm that a detected manufacturer is correct, or to ascertain the manufacturer where the manufacturer is not known. OCR and object recognition upon the equipment information may allow for detection of logos or insignia indicating the manufacturer, in addition or alternatively to parsing the information and looking for particular manufacturer names. Determining the manufacturer name may also allow feed into subsequent operations to allow method 300 to be performed more accurately and/or efficiently, with foreknowledge of the likely layout of the equipment information.

In operation 304, the layout of the equipment information is determined. As mentioned above, the layout may be obtained by detecting the manufacturer and/or the model of the object, or via such information being supplied by a user, which can then be used to look up, such as over the Internet or in a database, such as may be offered by central server 110, potential layout or layouts for the equipment information. Such layouts may indicate the relative location(s) of relevant information in the equipment information, allowing more accuracy in subsequent extraction of relevant information from non-relevant information.

Once the layout is known, in operation 306 pattern recognition may be used to extract the relevant information, such as model number, serial number, manufacture date, revision, operating specifications (e.g. voltage/current requirements, operating parameters such as temperature and speed, etc.). The layout may indicate where, in a two-dimensional pattern of text obtained from an image of the equipment information, these various text fields may be located, as opposed to field labels or other non- or less-relevant information, such as manufacturer contact information, disclaimers, certification marks, etc. This information may then be extracted from the data resulting from OCR, and in turn used to obtain necessary service and/or operation information, as discussed above.

In some embodiments, pattern recognition may be employed despite the layout of the equipment information not being known. In such embodiments, the particular sequences of letters and/or numbers may indicate model, serial number, and other relevant information. For example, where the manufacturer of a product is known, the manufacturer may follow a consistent scheme in model and serial numbers, such that system 100 can use the known scheme to determine which text in an the equipment information is a model number, a serial number, manufacturing date, etc.

In operation 308, additionally or alternatively, image context may be used, possibly in conjunction with pattern recognition in operation 306. Image context may include the presence of words such as "model", "serial", "s/n", "date", "specifications", and similar such words that may be found in an equipment information. Contextual extraction may be useful where the make and model of an object is unknown, and so the layout of the equipment information is not otherwise known. For example, the presence of the words "serial no." followed by or proximate to a string of numbers and/or letters may allow an implementing system, such as system 100, to conclude that the string of numbers and/or letters is likely to be a serial number. Such information may, in some embodiments, be presented to the user for confirmation, particularly where the layout leaves some room for ambiguity in a context-driven recognition algorithm.

It should be understood that the various operations of method 200 and/or method 300 may be performed at the same time, or at different times. Moreover, the various operations may be performed by different components of an implementing system, such as system 100, or some operations may be carried out by multiple components of the system, with each component carrying out distinct aspects of a given operation. In some embodiments, a consumer device 102 may execute an app that implements one or more operations of methods 200 and/or 300, including directly performing searches across the Internet, without the need to interface with a central server 110. In other embodiments, a central server 110 may provide some, all, or substantially all of the functionality for one or more operations of methods 200 and/or 300.

Figure 4:
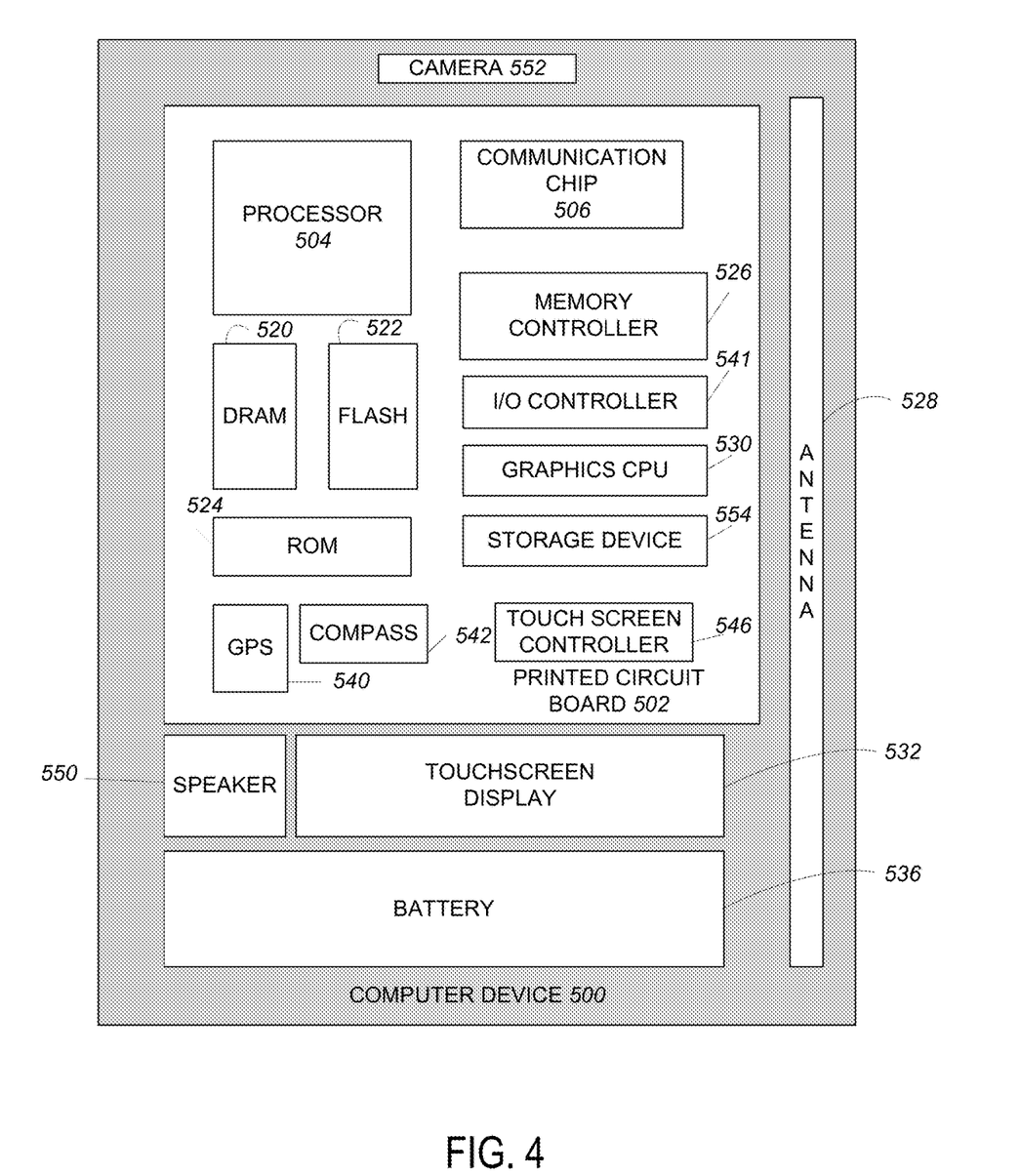
FIG. 4 is a block diagram of an example computer that can be used to implement some or all of the components of the system of FIG. 1, according to various embodiments.

FIG. 4 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100 and method 200 described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

Figure 5:
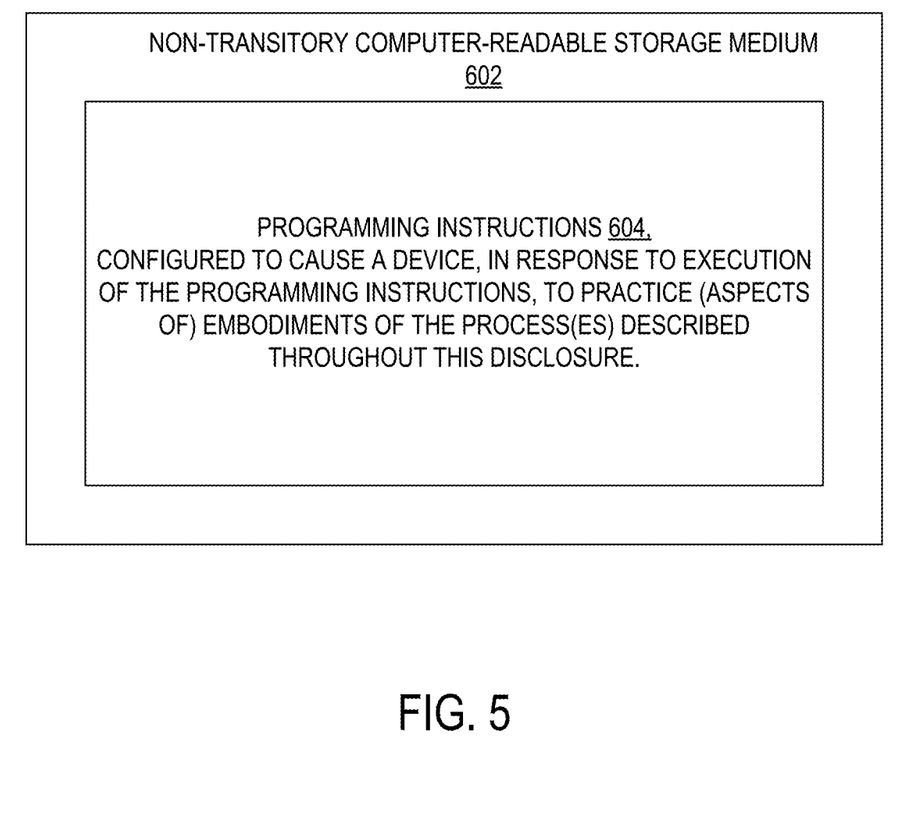
FIG. 5 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 100, method 200, and/or method 300. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

The invention claimed is:

1. A method comprising:
receiving, from a user device, an image of an object where an equipment information is not visible from an external view of the object, the equipment information comprising at least make, model, and serial number information for the object;
determining, from the image of the object, a location of the equipment information on the object and a layout of the equipment information, wherein the equipment information comprises a visual tag, and determining the location of the equipment information from the image of the object comprises:
    detecting, in the image of the object, a shape and position of one or more features of the object;
    searching, with the detected shape and position of the one or more features of the object, into a database to determine a likely make and model of the object; and
    obtaining, with the likely make and model of the object, instructions for locating the equipment information;
providing, to the user device, the instructions to assist a user of the user device in locating the location on the object of the equipment information, the instructions comprising a silhouette or shape of the visual tag to be presented on a display of the user device;
receiving, from a user device, an image of the equipment information;
extracting, from the image of the equipment information, identifying information about the object;
using the identifying information to query into a database containing service information about the object; and
transmitting, to a second user device in two-way communication with the user device, the service information about the object.

2. The method of claim 1, wherein determining a layout of the equipment information further comprises:
    determining, from the make and/or model of the object, a format of the visual tag; and
    using the format of the visual tag to extract the identifying information from the image of the equipment information.

3. The method of claim 1, wherein extracting the identifying information about the object comprises:
    performing character recognition on the image of the equipment information; and
    parsing any recognized characters to obtain the identifying information.

4. The method of claim 1, further comprising transmitting, to the user device, service information obtained in response to the query into the database.

5. The method of claim 1, wherein providing instructions for locating the location of the equipment information comprises providing one or more augmented reality objects for display on the user device that visually indicate the location of the equipment information.

6. A non-transitory computer-readable medium (CRM) comprising instructions that, when executed by an apparatus, cause the apparatus to:
    receive, from a user device, an image of an object where an equipment information is not visible from an external view of the object, the equipment information comprising at least make, model, and serial number information for the object;
    determine, from the object image, a location of the equipment information on the object and a layout of the equipment information, wherein the equipment information comprises a visual tag, and to determine the location of the equipment information from the image of the object, the instructions further cause the apparatus to:
        detect, in the image of the object, a shape and position of one or more features of the object;
        search, with the detected shape and position of the one or more features of the object, into a database to determine a likely make and model of the object; and
        obtain, with the likely make and model of the object, instructions for locating the equipment information;
    transmit, to the user device, the instructions to assist a user of the user device in locating the location on the object of the equipment information, wherein the instructions comprise a silhouette or shape of the visual tag to be presented on a display of the user device;
    receive, from the user device in response to transmission of the location of the equipment information, an image of the equipment information; and
    extract, from the image of the equipment information, identifying information about the object;
    use the identifying information to query into a database containing service information about the object; and
    transmit, to a second user device in two-way communication with the user device, the service information about the object.

7. The CRM of claim 6, wherein the instructions are to further cause the apparatus to:
    determine, from the make and/or model of the object, a format of the visual tag; and
    use the format of the visual tag to extract the identifying information from the image of the equipment information.

8. The CRM of claim 6, wherein the instructions are to further cause the apparatus to:
    perform character recognition on the image of the equipment information; and
    parse any recognized characters to obtain the identifying information.

9. The CRM of claim 6, wherein the instructions are to further cause the apparatus to transmit, to the user device, service information obtained in response to the query into the database.

10. The CRM of claim 6, wherein the user device is a smartphone, and the apparatus is a server remote from the smartphone.

11. A non-transitory computer-readable medium (CRM) comprising instructions that, when executed by an apparatus, cause the apparatus to:
    initiate, with a remote device, a two-way communications session;
    transmit, to a remote server, an image of an object where an equipment information is not visible from an external view of the object, the equipment information comprising at least make, model, and serial number information for the object;
    receive, from the remote server in response to transmission of the image of the object, instructions to assist a user of the apparatus in locating a location on the object of the equipment information, the instructions based at least in part on the image of the object, wherein the equipment information comprises a visual tag and the instructions comprise at least a silhouette or shape of the visual tag, and the location of the equipment information is determined from the image of the object by detection of, and search of a database with, a shape and position of one or more features of the object;
overlay, on a display of the apparatus, the instructions;
transmit, to the remote server, an image of the equipment information; and
receive, from the remote server, service information about the object, the service information based at least in part on the equipment information, wherein the service information about the object is also provided by the remote server to the remote device.

12. The CRM of claim 11, wherein the instructions are to further cause the apparatus to:
receive from the remote server, in response to transmission of the image of the object, a list of one or more makes and/or models of the object; and
transmit, to the remote server, a selection of one of the makes and/or models of the object from a last of one or more makes and/or models,
wherein the location of the equipment information and the service information is based at least in part on the selected make and/or model.

* * * * *